US008645625B2

(12) United States Patent
Bondurant et al.

(10) Patent No.: US 8,645,625 B2
(45) Date of Patent: *Feb. 4, 2014

(54) METHODS FOR IMPLEMENTATION OF WORM ENFORCEMENT IN A STORAGE SYSTEM

(75) Inventors: Matthew D. Bondurant, Superior, CO (US); Payman Dadashpour, Boulder, CO (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,192

(22) Filed: Sep. 12, 2012

(65) Prior Publication Data

US 2013/0067167 A1 Mar. 14, 2013

Related U.S. Application Data

(63) Continuation of application No. 12/199,286, filed on Aug. 27, 2008, now Pat. No. 8,291,179.

(60) Provisional application No. 60/977,773, filed on Oct. 5, 2007.

(51) Int. Cl.
*G06F 12/10* (2006.01)
*G06F 12/16* (2006.01)

(52) U.S. Cl.
USPC ........... 711/115; 711/161; 711/163; 711/209; 711/E12.058; 711/E12.103

(58) Field of Classification Search
None
See application file for complete search history.

(56) References Cited

U.S. PATENT DOCUMENTS

| 5,233,576 | A | 8/1993 | Curtis et al. |
| 5,360,651 | A | 11/1994 | Baxter et al. |
| 6,487,474 | B1 | 11/2002 | Goodman et al. |
| 6,779,080 | B2 | 8/2004 | Basham et al. |
| 7,631,161 | B2 * | 12/2009 | Haustein et al. .............. 711/163 |
| 7,685,389 | B2 * | 3/2010 | Haustein et al. .............. 711/163 |
| 7,694,096 | B2 * | 4/2010 | Haustein et al. .............. 711/163 |
| 8,171,244 | B2 | 5/2012 | Bondurant et al. |
| 2002/0035665 | A1 | 3/2002 | Basham et al. |
| 2004/0133740 | A1 | 7/2004 | Prewitt |
| 2005/0162991 | A1 | 7/2005 | Matsuura |

(Continued)

FOREIGN PATENT DOCUMENTS

| EP | 1688832 | 9/2005 |
| JP | 2006-065710 | 3/2006 |

(Continued)

OTHER PUBLICATIONS

Heeseung Jo et al. "FAB: flash-aware buffer management policy for portable media players," Consumer Electronics, IEEE Transactions on Consumer Electronics, 52(2): 485-493 (May 2006).

*Primary Examiner* — Reginald Bragdon
*Assistant Examiner* — Eric Loonan
(74) *Attorney, Agent, or Firm* — Dorsey & Whitney LLP

(57) ABSTRACT

Embodiments of archival storage system are disclosed. The archival storage system includes one or more removable disk drives that provide random access and are readily expandable. In embodiments, some or all of the data within the removable disk drive(s) is immutable. The archiving system creates a designation for the data representing the data as having Write Once Read Many (WORM) protection. Actions associated with the data may be received and determined to be read accesses. If the actions are something other than a read access, the archiving system, in embodiments, prevents the action on the data.

21 Claims, 10 Drawing Sheets

(56) References Cited

U.S. PATENT DOCUMENTS

| | | |
|---|---|---|
| 2005/0231846 A1 | 10/2005 | Winarski et al. |
| 2006/0123232 A1 | 6/2006 | Cannon et al. |
| 2006/0179087 A1* | 8/2006 | Fujii et al. .................... 707/205 |
| 2006/0230085 A1 | 10/2006 | Strahl et al. |
| 2007/0078890 A1 | 4/2007 | Hsu et al. |
| 2007/0094468 A1* | 4/2007 | Haustein et al. ............. 711/163 |
| 2007/0219948 A1 | 9/2007 | Bugovics |
| 2008/0040723 A1* | 2/2008 | Haustein et al. ............. 718/104 |
| 2009/0100224 A1 | 4/2009 | Wang |
| 2010/0017559 A1 | 1/2010 | Fruin et al. |
| 2010/0318501 A1 | 12/2010 | Alaimo et al. |

FOREIGN PATENT DOCUMENTS

| | | | | |
|---|---|---|---|---|
| JP | 2006-215954 | | 8/2006 | |
| WO | WO 02/25445 | * | 3/2002 | ............. G06F 12/00 |
| WO | WO 2004/090884 | | 10/2004 | |
| WO | WO 2006/134020 | | 12/2006 | |

* cited by examiner

METHODS FOR IMPLEMENTATION OF WORM ENFORCEMENT IN A STORAGE SYSTEM

CROSS-REFERENCES TO RELATED APPLICATIONS

This application is a continuation of U.S. application Ser. No. 12/199,286, filed Aug. 27, 2008, now issued as U.S. Pat. No. 8,291,179, which claims priority to U.S. Provisional Patent Application Ser. No. 60/977,773, filed Oct. 5, 2007, entitled "METHODS FOR IMPLEMENTATION OF WORM ENFORCEMENT IN A STORAGE SYSTEM," each of which is hereby incorporated herein in its entirety by reference.

BACKGROUND OF THE INVENTION

Embodiments of the disclosure generally relate to storage systems and, more specifically, but not by way of limitation, to archiving storage systems.

Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage.

Further, these organizations often also require the data stored in the archiving system to be immutable. Immutability is a requirement that once the data is written into the archiving system the data cannot be overwritten or deleted. Thus, once data is stored to the archiving system, some type of protection is warranted to ensure the immutability of the data.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
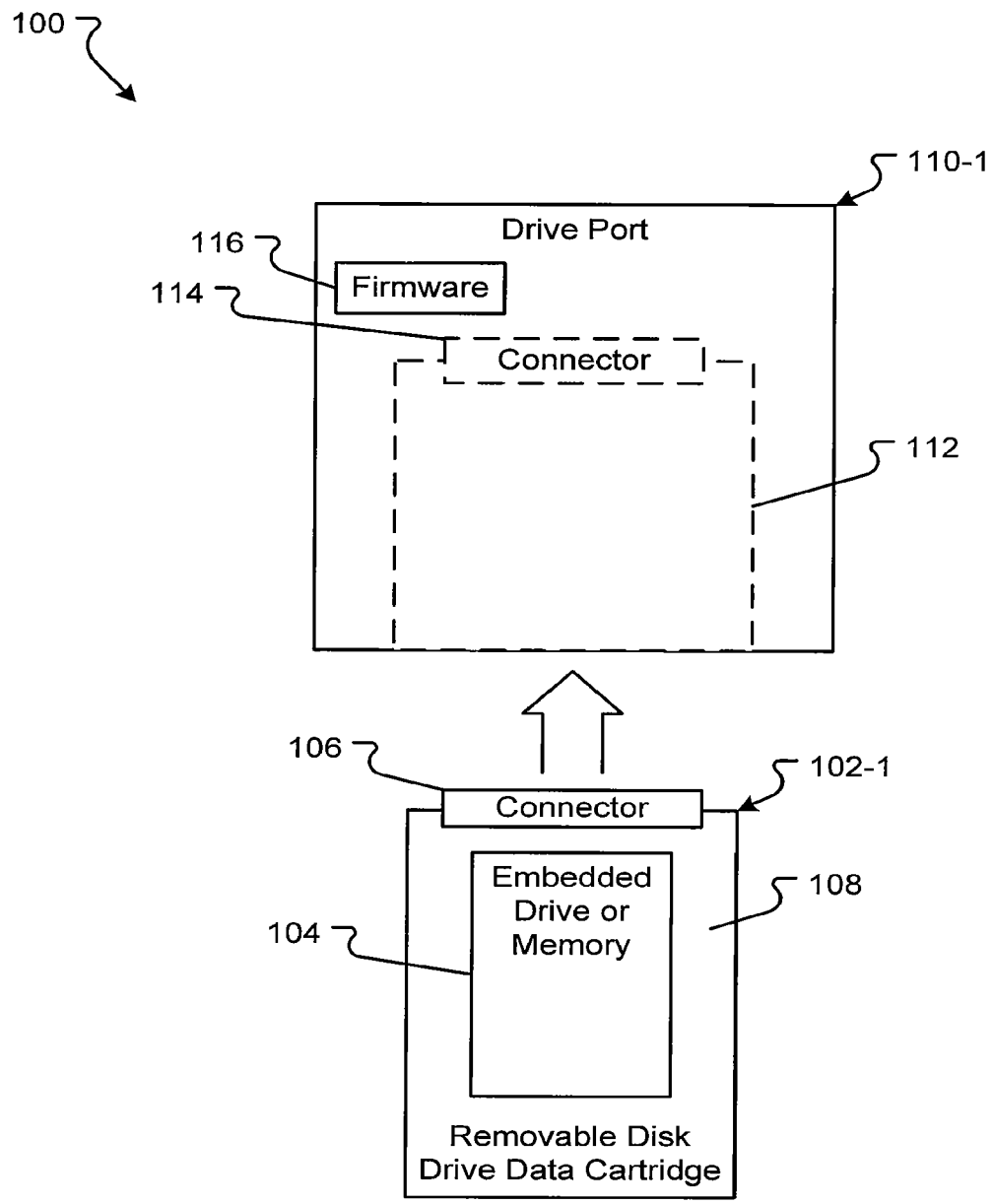
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION OF THE SPECIFIC EMBODIMENTS

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing exemplary embodiments of the disclosure. It being understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer readable medium that defines processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The present disclosure generally provides a unique and novel archiving system that provides Write Once Read Many (WORM) enforcement on archived data. Embodiments include an archiving system having removable hard disk drives embedded in removable disk cartridges, referred to simply as removable disk drives. The removable disk drives allow for expandability, easy replacement, and multiple read/write capability such that the archiving system need not be duplicated to add new or more storage capacity. Further, the removable disk drives provide advantages in speed and data access because, in embodiments, the data is stored and retrieved by random access rather than sequential access.

An embodiment of a network storage system 100 to provide long-term archival data storage is shown in FIG. 1. A removable disk drive 102-1 provides storage capability for the network storage system 100. In embodiments, the removable disk drive 102-1 includes a data cartridge case 108 and an embedded memory 104, which may be an embedded hard disk drive (HDD), solid state disk (SSD), solid state drive, or flash memory. The HDD, SSD, or flash memory provides a random access memory for storage of archived data. The embedded memory 104 is electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. The data cartridge case 108, in embodiments, provides a solid container for the embedded memory 104 that also functions as an easily swappable or changed case when interchanging removable disk drives 102-1.

In embodiments, the network storage system 100 contains a drive port 110-1 that includes one or more data cartridge ports 112, each data cartridge port 112 including a data cartridge connector 114 to receive the removable disk drive 102-1. The data cartridge connector 114 mates with the electrical connector 106 of the removable disk drive 102-1 to provide an electrical connection to the removable disk drive 102-1 and/or to communicate with the embedded memory 104 in the removable disk drive 102-1. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the removable disk drive 102-1 to be easily inserted and removed as necessary. In embodiments, the drive port 110-1 includes two or more data cartridge ports 112 to allow for the use, control and communication with two or more removable disk drives 102-1. Each drive port 110-1, in embodiments, is separately addressable to allow for customized control over each removable disk drive 102-1 connected to each data cartridge port 112. Thus, as removable disk drives 102-1 are replaced, the same controls can be applied to the newly inserted removable disk drives 102-1 because the drive port 110-1 is addressed instead of the removable disk drives 102-1. More description regarding customizable control is provided in conjunction with FIGS. 3-11.

The embedded memory 104 may be read and used by the firmware 116 of the drive port 110-1. The firmware 116 may be hardware and/or software resident in the drive port 110-1 for controlling the removable disk drive 102-1. In embodiments, the firmware 116 contains the necessary software and/or hardware to power-up the removable disk drive 102-1, spin-up the disk platters in the embedded memory 104, read and write to the embedded memory 104, etc. For example, the firmware 116 could read the embedded memory 104 to identify the removable disk drive 102-1 and gather information related to its contents.

In embodiments, the network storage system 100 operates to receive one or more removable disk drives 102-1 in the one or more drive ports 110-1. The electrical connector 106 physically connects or couples with the data cartridge connector 114 to form an electrical connection that allows the drive port 110-1 to communicate with the embedded memory 104. The firmware 116 powers-up the embedded memory 104 and begins any initialization processes (e.g., security processes, identification processes, reading and/or writing, etc.). The drive port 110-1, which, in embodiments, is in communication with a network, receives archival data from one or more servers, applications, or other devices or systems on the network. The firmware 116 writes the archival data to the embedded memory 104 of the removable disk drive 102-1 to archive the data.

Figure 2:
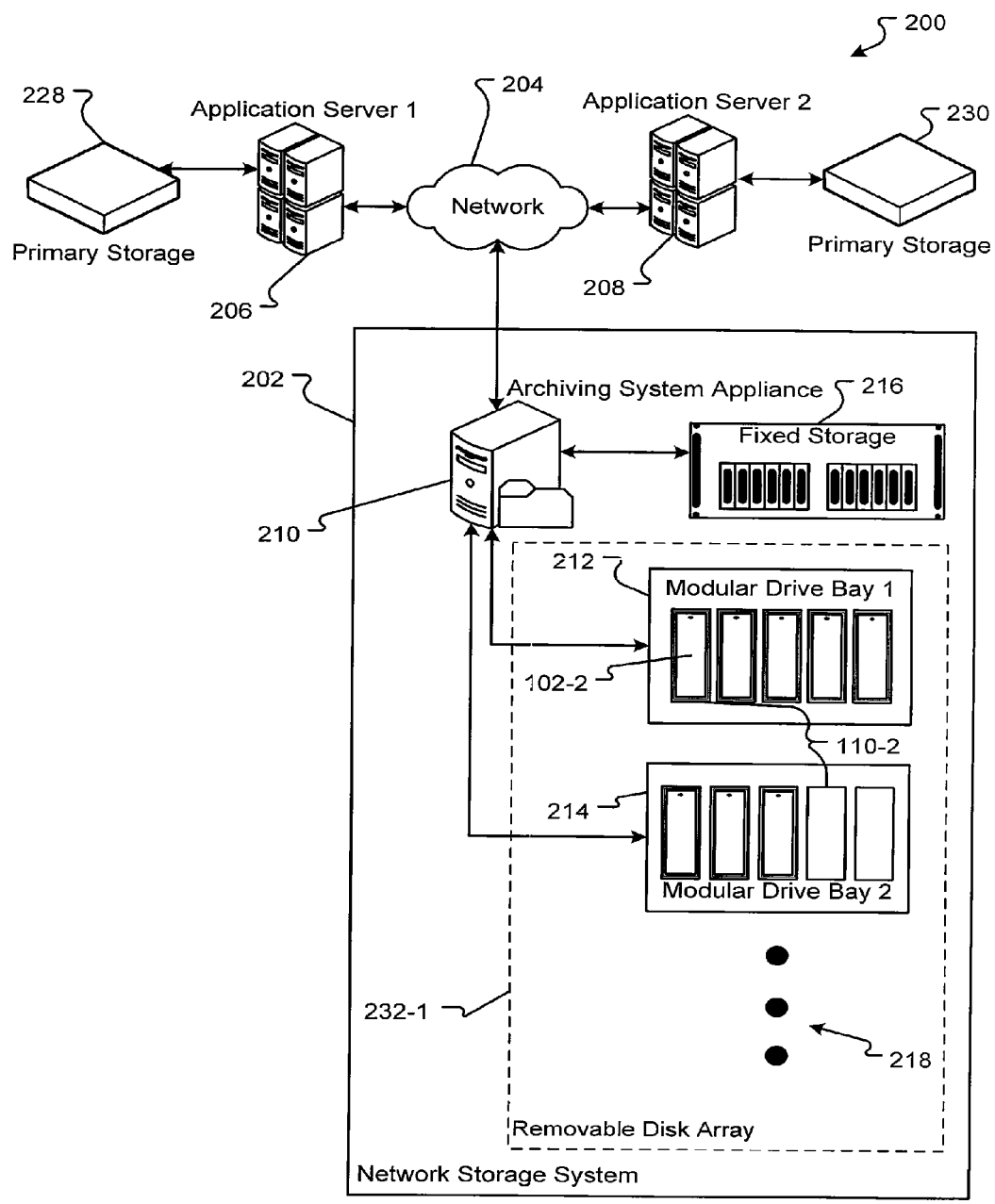
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage device or system 202 in communication, via a network 204, with one or more systems. In embodiments, the systems that communicate with the network storage system 202 comprise applications, application servers, other servers, peripherals, other devices and systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the embodiments set forth herein.

The network storage system 202 comprises one or more components that may be encompassed in a single physical structure or be comprised of discrete components. In embodiments, the network storage system 202 includes an archiving system appliance 210 and one or more removable disk drives 102-2 connected or in communication with one or more drive ports 110-2. In alternative embodiments, a modular drive bay 212 and/or 214 includes two or more drive ports 110-2 that can each connect with a removable disk drive 102-2. Thus, the modular drive bays 212 and 214 provide added storage capacity because more than one removable disk drive 102-2 can be inserted and accessed using the same archiving system appliance 210. Further, each drive port 110-2 in the modular drive bays 212 and 214 are, in embodiments, separately addressable allowing the archiving system appliance 210 to configure the removable disk drives 102-2 in the modular drive bays 212 and 214 into groups of one or more removable disk drives.

More than two modular drive bays 212 and 214, in embodiments, are included in the network storage system 202, as evidenced by the ellipses 218. Thus, as more data storage capacity is required, more modular drive bays 212 and 214 may be added to the network storage system 202.

The exemplary hardware architecture in FIG. 2 provides near limitless capacity as more removable disk drives 102-2 can be added to existing modular drive bays 212 or 214 until the modular drive bays hold all possible removable disk drives. Then, more modular drive bays 212 and 214 are added to the network storage system 202. Further, removable disk drives 102-2 may be replaced as the removable disk drives 102-2 near their storage capacity. The removed disk drives 102-2, in embodiments, are physically stored if and until the data on the removable disk drives 102-2 needs to be retrieved. If the data on the removable disk drive 102-2 needs to be retrieved, the removable disk drive 102-2 may be inserted into one of the drive ports 110-2 of the modular drive bay 212 or 214, and the information retrieved.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

The archiving system appliance 210, in embodiments, is a closed system that only allows access to the network storage system 202 by applications or other systems and excludes access by users. Thus, the archiving system appliance 210 provides protection to the network storage system 202.

In embodiments, the two or more modular drive bays 212 and/or 214, having one or more inserted removable disk drives 102-2, form a removable disk array (RDA) 232-1. The archiving system appliance 210 can configure the RDA 232-1 into one or more independent file systems. Each application server requiring archiving of data may be provided a view of the RDA 232-1 as one of two or more independent file systems. In embodiments, the archiving system appliance 210 partitions the RDA 232-1 and associates one or more drive ports 110-2 with an application layer partition(s). Thus, the one or more drive ports 110-2, and the removable disk drives 102-2 inserted therein, comprise the application layer partition that appears as an independent file system. In embodiments, the application layer partition is different from a logical partition in that the application layer partition is associated with drive ports and not portions of memory in a hard disk drive and that the application layer partitions are associated with the application or application server that stores archival data into the application layer partition and not a logical function of the operating system.

In further embodiments, the archiving system appliance 210 provides an interface to application server 1 206 and application server 2 208 that allows the application servers 206 and 208 to communicate archival data to the archiving system appliance 210. The archiving system appliance 210, in embodiments, determines where and how to store the data to one or more removable disk drives 102-2. For example, the application server 1 206 stores archival data in a first "drive". The drives are, in embodiments, presented to the applications servers 206 and 208 where write and read permissions for any one drive is specific to one of the application servers. As such, the network storage system 202 provides a multiple and independent file system to each application server 206 and 208 using the same hardware architecture.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides for storing certain data for a short period of time where the data may be more easily accessed. In embodiments, the archiving system appliance 210 copies archival data to both the fixed storage 216 and the removable disk drive 102-2. If the data is needed in the short term, the archiving system appliance 210 retrieves the data from the fixed storage 216.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the fixed storage 216 and/or one or more of the removable disk drives 102-2 in one or more of the drive ports 110-2. The archival data is written to the removable disk drive 102-2 for long-term storage. In further embodiments, application server 2 208 writes primary data to a primary storage 230 and also sends archival data to the network storage system 202. In some embodiments, the archival data from application server 2 208 is stored to a different removable disk drive 102-2 because the archival data from application server 2 208 relates to a different application.

Figure 3:
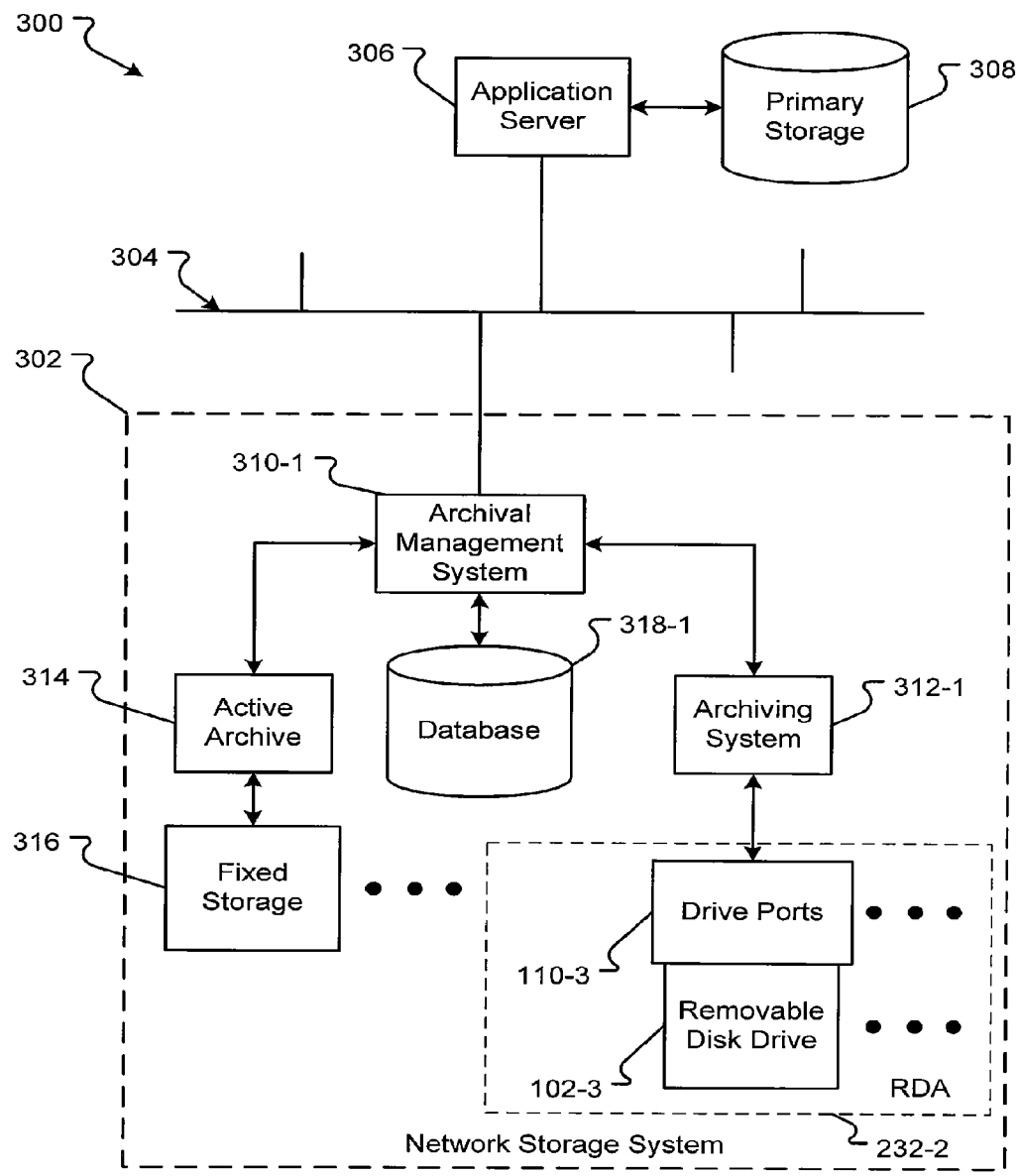
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312-1 in communication with one or more drive ports 110-3 that are in communication with one or more removable disk drives 102-3. The drive ports 110-3 and removable disk drives 102-3 are similar in function to the drive port 110-1 and removable disk drive 102-1 described in conjunction with FIG. 1. The archiving system 312-1 controls the function of the one or more drive ports 110-3 and writes the archived data to one or more predetermined removable disk drives 102-3 in the one or more drive ports 110-3.

In further embodiments, the network storage system 302 comprises an archival management system 310-1. The archival management system 310-1 receives data for archiving from one or more systems on the network 304. Further, the archival management system 310-1 determines to which system or removable disk drive 102-3 the data should be archived, in which format the data should be saved, how to provide security for the network storage system 302, etc. In embodiments, the archival management system 310-1 provides a partitioned archive such that the network storage system 302 appears to be an independent file system to each separate application server 306, yet maintains the archive for multiple application servers 306. Thus, the archival management system 310-1 manages the network storage system 302 as multiple, independent file systems for one or more application servers 306. In embodiments, the archival management system 310-1 and the archiving system 312-1 are functional components of the archiving system appliance 210 (FIG. 2).

In embodiments, the archival management system 310-1 saves archival data to both the archiving system 312-1 and an active archive 314. The active archive 314, in embodiments, controls, reads from, and writes to one or more fixed storage devices 316 that allow easier access to archived data. In embodiments, fixed storage 316 is similar in function to fixed storage 216 (FIG. 2). The active archive 314 performs similar functions to the archiving system 312-1 but for the fixed storage devices 316. In embodiments, the active archive 314 and the fixed storage devices 316 are components of the hardware fixed storage system 216 (FIG. 2). In alternative embodiments, the active archive 314 partitions the fixed storage 316 to mimic the application layer partitions in the RDA 232-2. The application layer partition in the active archive 314 may have boundaries associated with memory addresses in the fixed storage 316.

The archival management system 310-1 may also provide an intelligent storage capability. Each type of data sent to the network storage system 302 may have different requirements and controls. For example, certain organizations, such as the Securities and Exchange Commission (SEC), Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310-1 can apply controls to different portions of the RDA 232-2 archive according to user-established data storage requirements. In one embodiment, the archival management system 310-1 creates application layer partitions in the archive that span one or more removable disk drives 102-3. All data to be stored in any one partition can have the same requirements and controls. Thus, requirements for data storage are applied to different drive ports 110-2 (FIG. 2) in the modular drive bays 212 and 214 (FIG. 2) and to the removable disk drives 102-2 (FIG. 2) stored in those drive ports 110-2 (FIG. 2). Further, the requirements are likewise applied to different portions of the fixed storage 316 in the active archive 314. If a removable disk drive is replaced, the same storage requirements, in embodiments, are applied to the replacement removable disk drive 102-3 because of the drives 102-3 location in the controlled drive port 110-3. As such, the archival management system 310-1 can individually maintain separate sets of data using different controls, even in different removable disk drives.

The network storage system 302 may also comprise a database 318-1 in communication with the archival management system 310-1. The database 318-1 is, in embodiments, a memory for storing information related to the data being archived. The database 318-1 may include HDDs, ROM, RAM or other memory either internal to the network storage system 302 and/or the archival management system 310-1 or separate as a discrete component addressable by the archival management system 310-1. The information stored in the database 318-1, in embodiments, includes one or more of, but is not limited to, data identification, application server identification, time of storage, removable disk drive identification, data format, encryption keys, etc.

The network 304, in embodiments, connects, couples, or otherwise allows communications between one or more other systems and the network storage system 302. For example, the application server 306 is in communication with and/or connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310-1. The archival management system 310-1, in embodiments, sends the data to one or both of the active archive 314 and/or the archiving system 312-1 to be archived. Controls, such as immutability, may then be applied to the archived data in the active archive 314 and/or the RDA 232-2.

Figure 4:
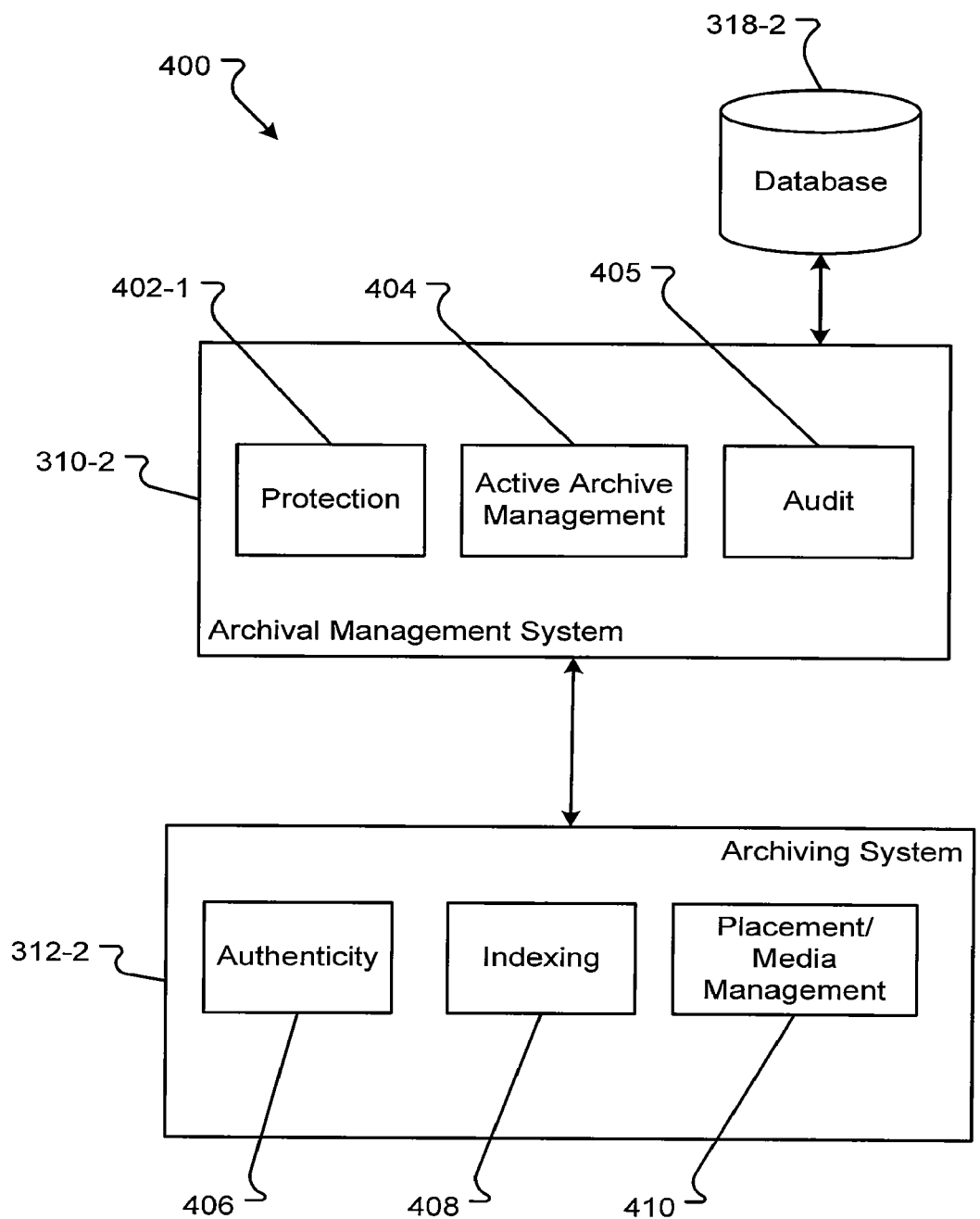
FIG. 4 is a block diagram of embodiments of an archival management system and an archiving system.

Embodiments of an archival management system 310-2 and an archiving system 312-2, including one or more components or modules, are shown in FIG. 4. In embodiments, the archival management system 310-2 comprises one or more of a protection module 402-1, an active archive management module 404, and an audit module 405. In embodiments, the protection module 402-1 protects access to the archiving system 302 (FIG. 3) by applications, application servers, or other components on the network. For example, the protection module 402-1 prohibits a user from accessing the archiving system 312-2 if the archiving system 312-2 is a closed system. Thus, the protection module 402 may authenticate a system, determine access rights of the system, perform decryption of data, and other processes. In alternative embodiments, the protection module 402-1 accepts and enforces controls for immutability as described in conjunction with FIGS. 5-9.

The active archive management module 404, in embodiments, manages data written to and read from the active archive 314 (FIG. 3). In embodiments, the active archive management module 404 determines if archival data should be written to the active archive 314 (FIG. 3) based on information provided by the application server or on information stored in the database 318-2. In further embodiments, the active archive management module 404 determines when data in the active archive 314 (FIG. 3) is removed from the active archive 314 (FIG. 3).

The audit module 405, in embodiments, stores data about the archival data stored in the archiving system 312-2. In embodiments, the audit module 405 records information, for example, the application server that sent the data, when the data was received, the type of data, where in the archiving system 312-2 the data is stored, the period of time the data will be stored in the active archive 314 (FIG. 3), etc. The audit module 405 can provide a "chain of custody" for the archived data by storing the information in the database 318-2.

The archiving system 312-2, in embodiments, includes one or more of an authenticity module 406, an indexing module 408 and/or a placement/media management module 410. In embodiments, the authenticity module 406 determines if a removable disk drive is safe to connect with the archiving system 312-2. For example, the authenticity module 406 may complete an authentication process, such as, pretty good privacy (PGP), a public-key encryption process, or other authentication process, using one or more keys to verify that the inserted removable disk drive has access to the archiving system 312-2.

The indexing module 408, in embodiments, creates application layer partitions in the RDA 232-1 (FIG. 2) to provide storage areas for different data. For example, the indexing module 408 selects one or more removable disk drives to form one or more "drives". "Drive A:\" may comprise one or more removable disk drives, while "Drive B:\" and "Drive C:\" may also include one or more removable disk drives. In embodiments, each drive is associated with an application layer partition of the RDA 232-1 (FIG. 2). In embodiments, each drive or application layer partition stores only a predetermined type of data that relates to one or more application servers. For example, "Drive A:\" stores email data, while "Drive B:\" stores Health Insurance Portability and Accountability Act (HIPAA) data. The application servers can view the application layer partition in the RDA 232-1 (FIG. 2) and, as such, views the RDA 232-1 (FIG. 2) as a virtual archiving system with a separate, independent drive inside the RDA 232-1 (FIG. 2) for the application server. One application server may only access the one or more drives related to the data the application server archives and may not access other drives not associated with the data the application server archives. In alternative embodiments, the active archive management module 404 also partitions the active archive 314 (FIG. 3) in a similar manner.

In further embodiments, the indexing system 408 provides controls for each drive. How data is archived for one type of data may be different from how a second type of data is archived. For example, an organization (e.g., the SEC) may require email to be stored for seven (7) years while the FDA may require clinical trial data to be stored for thirty (30) years. The indexing system 408 can manage each drive differently to meet the requirements for the data. For example, the indexing system 408 may store email on drive A:\ for three months and store HIPAA data on drive B:\ for six months. The indexing system 408, in embodiments, stores information about which removable disk drives comprise the separate application layer partitions and enforces the controls on those removable disk drives. Other controls enforced by the indexing module 408 may include the format of data stored on a drive, whether data is encrypted on the removable disk drive, how data is erased on a removable disk drive, immutability, etc.

In embodiments, the placement/media management module 410 manages the removable disk drives in the RDA 232-1 (FIG. 2). For example, the placement/media management module 410 determines when cartridges need replacing because the removable disk drive is at or near capacity. In embodiments, the placement/media management module 410 also separately addresses the removable disk drives and provides the addressing information to the indexing module 408 for storing data in the correct application layer partition.

Some organizations require that archived data be immutable, that is, the data cannot be overwritten or deleted for a period of time. To ensure data stored in the RDA 232-1 (FIG. 2) is immutable, the protection module 402-1, placement/media management module 410, and/or the indexing module 408, in embodiments, enforces a WORM process on the removable disk drives and/or the active archive storing immutable data. The WORM process may comprise one or more functions that write data to the removable disk drive in a manner that prevents it from being overwritten, e.g., write protection, sequential writing to disk, etc. Data for an application layer partition may require WORM enforcement according to the indexing module 408 or the protection module 402-1. The protection module 402-1 can determine what removable disk drives are associated with the application layer partition needing WORM enforcement and enforce the WORM process on the removable disk drives associated with the application layer partition.

Figure 5:
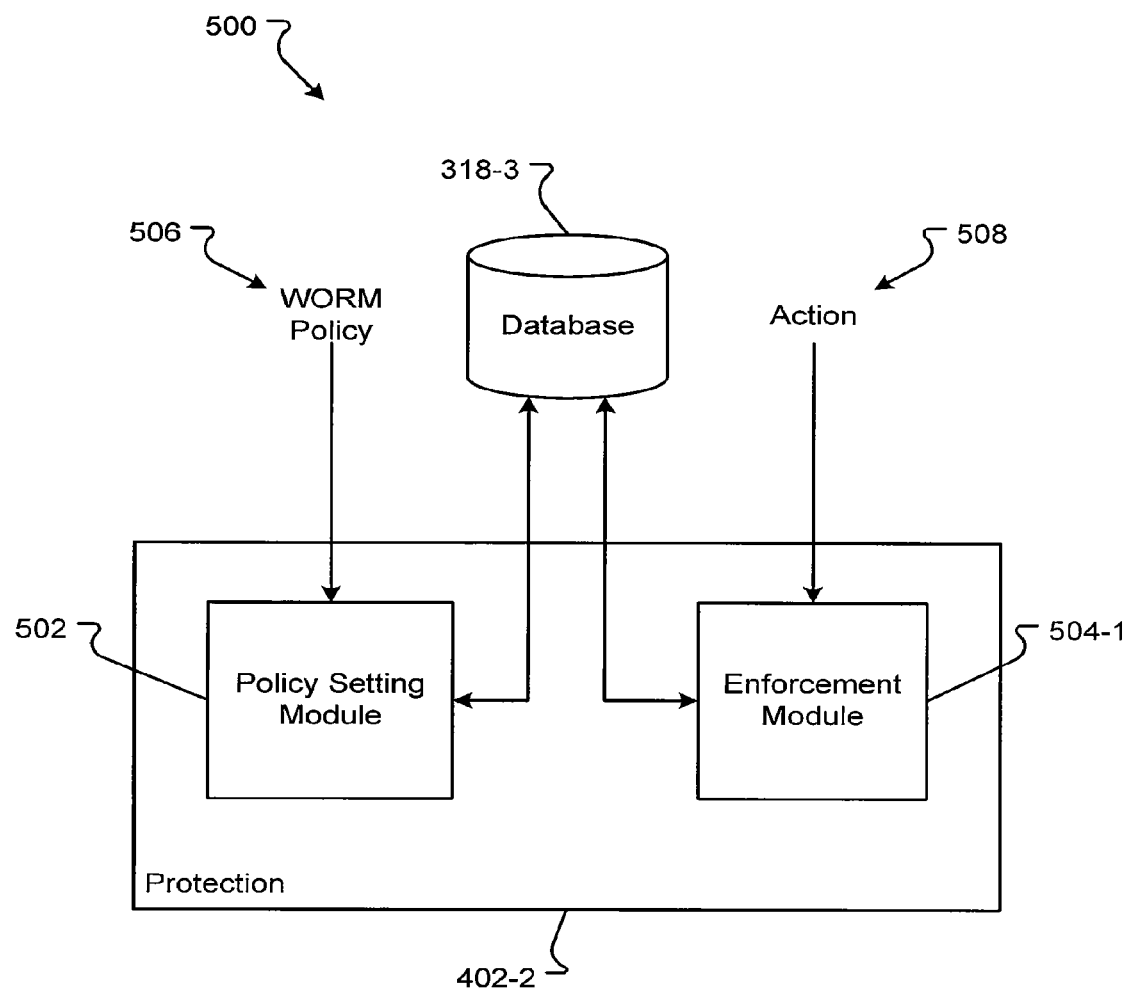
FIG. 5 is a block diagram of an embodiment of a protection module within an archival management system.

An embodiment of a protection module 402-2 is shown in FIG. 5. In embodiments, the one or more modules or functions described herein may also apply to the indexing module 408 (FIG. 4) or the placement/media management module 410 (FIG. 4). The protection module 402-2, in embodiments, comprises a policy setting module 502 and/or an enforcement module 504-1. The policy setting module 502 and/or an enforcement module 504-1 may be hardware, software, or a combination of hardware and software. In embodiments, a user or other entity may establish controls, such as immutability, in the archiving system. The policy setting module 502, in embodiments, receives a control setting 506 for WORM enforcement on immutable data. The policy setting module 502 can save the WORM policy and the WORM settings into the database 318-3. In one embodiment, the WORM policy is applied to an application layer partition, and the WORM policy settings are applied to all removable disk drives or parts of the active archive in the application layer partition. The WORM policies may, in alternative embodiments, be applied to predetermined removable disk drives not necessarily related to an application layer partition or to predetermined portions of data within an application layer partition or within the RDA. Regardless, the protection setting module 502 can establish the WORM controls described in FIGS. 6A-B.

The enforcement module 504-1, in embodiments, enforces the WORM policy. In embodiments, the enforcement module receives actions 508 associated with archived data within the archiving system. The enforcement module 504-1 can then access the database 318-3 to read the WORM policy settings for the archived data. If the archived data has a WORM policy setting and the action 508 is something other than a read, the enforcement module 504-1 may reject the action 508. The enforcement module 504 is, in embodiments, as described in FIGS. 7-9.

Figure 6A:
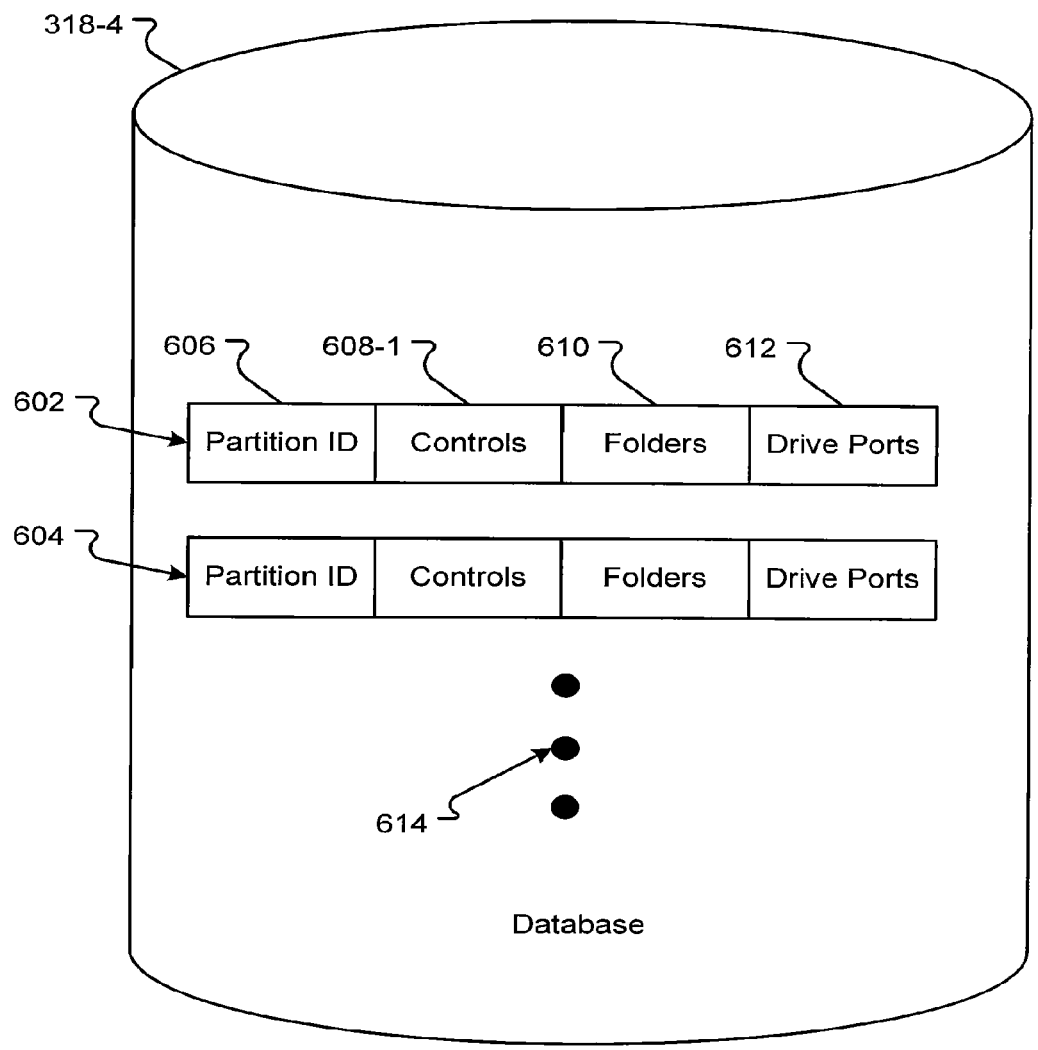
FIGS. 6A-B are block diagrams of embodiments of a database for storing information about the archived data in an archiving system.
Figure 6B:
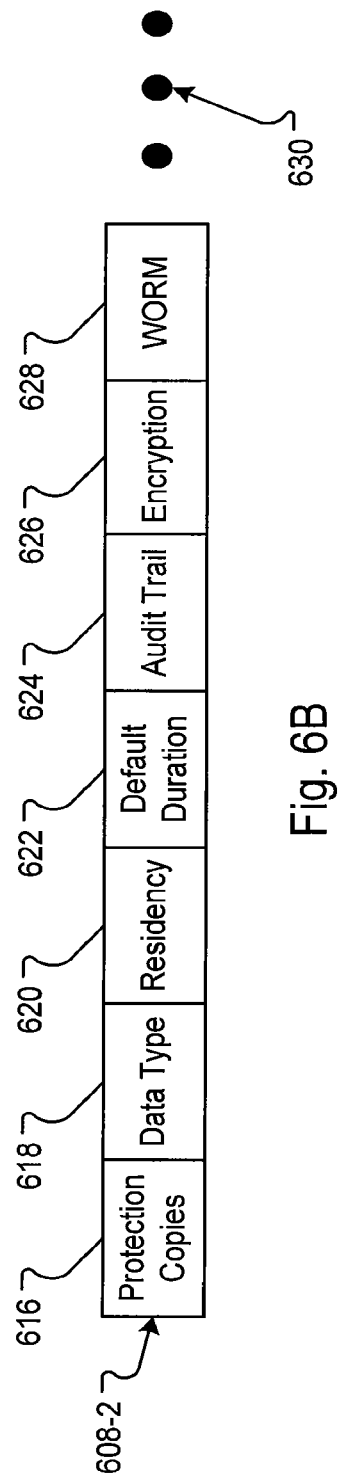

Embodiments of a database 318-4 comprising one or more data structures for organizing an RDA into application layer partitions is shown in FIGS. 6A-6B. In embodiments, the database 318-4 is similar or the same as database 318-1 (FIG. 3). The database 318-4 can be an application layer partition table or other data structure for storing the information described herein. In an embodiment, the database 318-4 includes one or more application layer partition fields 602 and 604 that represent the application layer partitions in the RDA. There may be fewer or more than two application layer partition fields as represented by the ellipses 614. Each application layer partition field 602 or 604 may have one or more fields representing data about the application layer partition represented by the application layer partition fields 602 or 604.

In embodiments, an application layer partition field 602 may comprise one or more of, but is not limited to, an application layer partition identification field 606, one or more control fields 608-1 and/or one or more drive port fields 612. In alternative embodiments, the application layer partition field 602 also includes one or more folder fields 610. The application layer partition identification field 606, in embodiments, includes an identification that can be used by an application server to send data to the application layer partition represented by the application layer partition field 602. In one embodiment, the application layer partition identification field 606 is a GUID for the application layer partition. In another embodiment, the application layer partition identification field 606 is the drive letter assigned to the application layer partition. For example, application layer partition field 602 represents application layer partition 1, and the application layer partition identification field 606 would be drive letter "A:\".

Further embodiments of the application layer partition field 602 include one or more drive port fields 612. In embodiments, the one or more drive port fields 612 associate one or more drive ports with the application layer partition. The association may include listing the one or more interface addresses for the one or more drive ports in the one or more drive port fields 612. In other embodiments, a drive port is assigned a slot number or identification. The slot number may then be stored in the drive port field 612. The drive port fields 612 can be used by the network storage system to address archival data to one or more removable disk drives electrically connected to the one or more drive ports listed in the drive port fields 612. In alternative embodiments, the application layer partition field 602 also includes a list of memory addresses in the active archive for the application layer partitions in the active archive.

One or more control fields 608-1 and one or more folder fields 610-1, in embodiments, are also included in the application layer partition field 602. The control fields 608-1 provide one or more controls for the application layer partition represented by the application layer partition field 602. Likewise, the folder fields 610-1 provide a designation of one or more folders that can be used for storing data in the application layer partition represented by the application layer partition field 602. Embodiments of the control fields 608-1 are further described in conjunction with FIG. 6B.

An embodiment of one or more control fields 608-2 is shown in FIG. 6B. The control fields 608-2 may include one or more of a protection copies field 616, a data type field 618, a residency field 620, a default duration field 622, an audit trail field 624, an encryption field 626, and a WORM field 628. The control fields 608-2 may include other or more fields as represented by the ellipses 630. The protection copies field 616, in embodiments, includes a number of copies that are to be kept of the data. For example, if there is a two (2) in the protection copies field 616, two copies of the application layer partition or of the data within the application layer partition is maintained in the RDA.

The data type field 618, in embodiments, represents how the data is maintained. For example, the data type field 618 includes a designation that the data in the application layer partition is WORM data. As such, all data in the application layer partition is provided WORM protection. In alternative embodiments, the control fields 608-2 includes a separate WORM field 628, and the data type field 618 describes the type of data stored, such as, email data, HIPAA data, etc.

In embodiments, the residency field 620 is a set of memory addresses of where the memory is stored in the RDA or in the active archive. Each set of data in the RDA or active archive can have an identification that can be associated with a memory address, such as a memory offset. The default duration field 622, in embodiments, sets a duration for maintaining the data in the RDA or active archive. For example, an outside organization may require the data in the application layer partition to be maintained for six (6) months. The default duration field 622 is set to six months to recognize this limitation.

The audit trail field 624, in embodiments, is a flag that, if set, requires an audit trail to be recorded for the data. In embodiments, the audit trail includes a log or record of every action performed in the RDA that is associated with the data. For example, the time the data was stored, any access of the data, any revision to the data, or the time the data was removed would be recorded in the audit trail. In other embodiments, the audit trail field 624 comprises the record or log of the audit trail.

In embodiments, the encryption field 626 comprises a flag of whether the data in the application layer partition is encrypted. If the flag is set, the data is encrypted before storing the data into the RDA and/or the active archive. In alternative embodiments, the encryption field 626 also includes the type of encryption, for example, AES 256, the public key used in the encryption, etc., and/or the keys for encryption.

A WORM field 628, in embodiments, comprises a flag that, if set, requires that all data in the application layer partition has WORM protection because the data is immutable. In other embodiments, the default is WORM protection and if the flag is set, the data is not WORM protected. The WORM protection, in embodiments, applies to all data in the application layer partition. In alternative embodiments, WORM protection may apply to specific folders or files.

Figure 7:
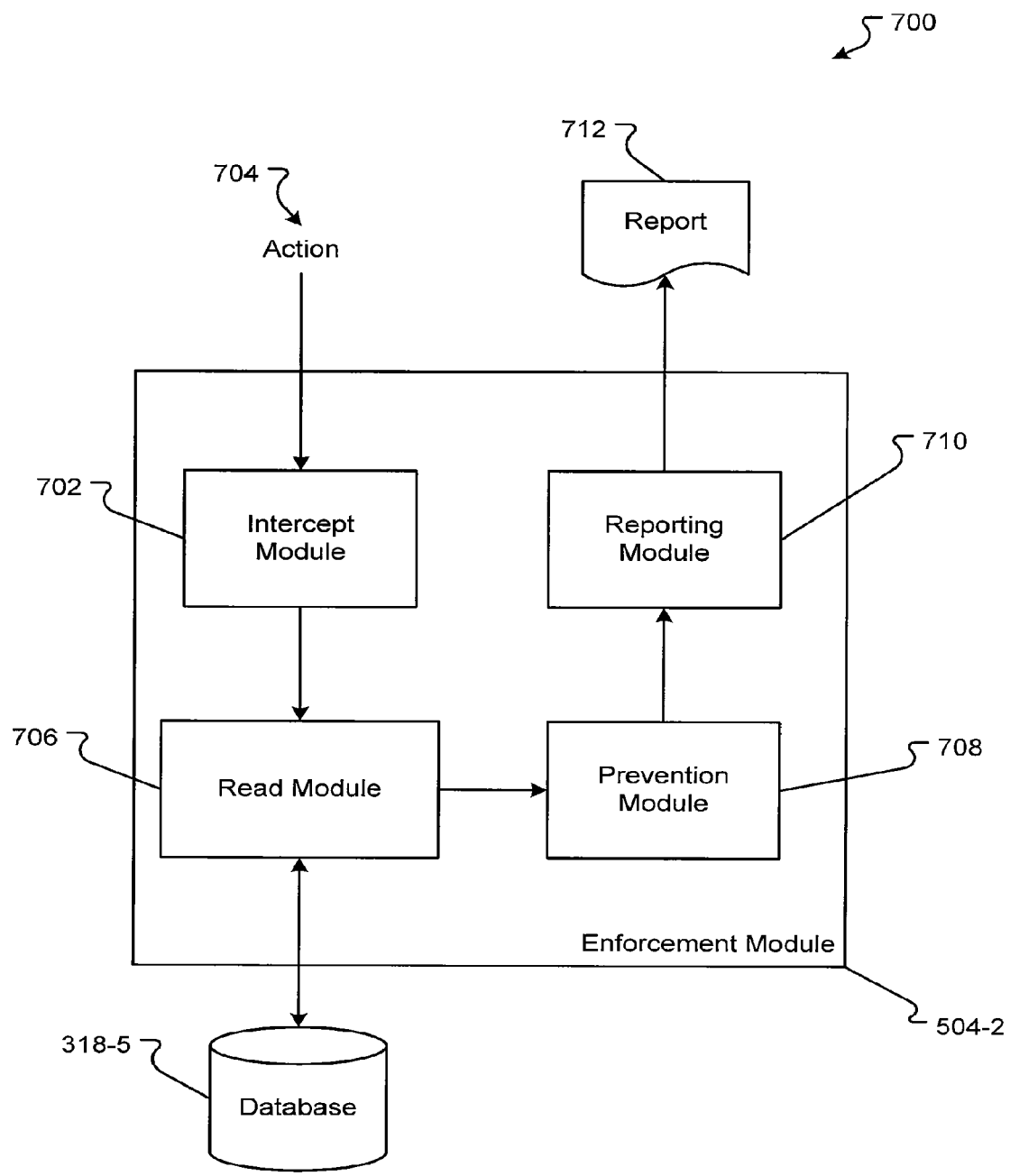
FIG. 7 is a block diagram of an embodiment of an enforcement module within a protection module.

An embodiment of an enforcement module 504-2 is shown in FIG. 7. The enforcement module 504-2, in embodiments, comprises one or more of, but is not limited to, an intercept module 702, a read module 706, a prevention module 708, and a reporting module 710. The intercept module 702 can intercept actions 704 being processed by the network storage system 302 (FIG. 3). An action 704 can be any process completed by the network storage system 302 (FIG. 3). In embodiments, an action 704 is a request by an application server, process, or other entity that will affect archived data that is subject to WORM enforcement. For example, an action 704 may be a request to delete data in the network storage system 302 (FIG. 3) that is protected with WORM settings.

The intercept module 702, in embodiments, reads the program stack of the archival management system 310-1 (FIG. 3). The program stack is, in embodiments, the ordered collection of software processes that the archival management system 310-1 (FIG. 3) executes. Every time an action 704 is received, the action 704 is placed into the program stack. In one embodiment, the intercept module 702 intercepts the action 704 before being placed in the program stack. In other embodiments, the action 704 is placed in the program stack and then read by the intercept module 702.

The intercept module 702 can also determine if the action 704 is a process that would violate WORM protection. If the action 704 violates WORM policies, the intercept module 702, in embodiments, signals the read module 706 to read the data associated with the action 704. In embodiments, the intercept module 702 passes the data associated with the action 704 to the read module 706.

The read module 706, in embodiments, reads one or more portions of data or metadata associated with the action 704. Each action 704 can include data or metadata that can describe the action 704. For example, the data or metadata about the action 704 includes the type of action, an identifier of the requester, the time of the action, the date of the action, etc. In alternative embodiments, the read module 706 determines if the action violates WORM settings. In embodiments, the read module 706 reads the selected data and passes the selected data to the prevention module 708 or passes a signal that the action violates WORM settings.\\\

In embodiments, the prevention module 708 prevents actions that violate WORM settings. The prevention module 708 receives the data from the read module 706. In embodiments, the prevention module 708 removes the action from the program stack. In alternative embodiments, the prevention module 708 prevents the action from being placed into the program stack. The prevention module 708 may also deny access for any action to a certain removable disk drive or area of the active archive.

The reporting module 710, in embodiments, responds to the prevention of an action by reporting it to the initiator. The reporting module 710 can respond to the prevention by the prevention module 708 and read the data supplied by the read module 706. In embodiments, the reporting module 710 presents the notification of the prevention of the action in a report 712 that can be sent to the requester or provided to the requester. The report 712 details that the action was prevented from completing due to WORM enforcement. The report 712 may be emailed to the requester, displayed on a display device, or provided by other processes or functions.

Figure 8:
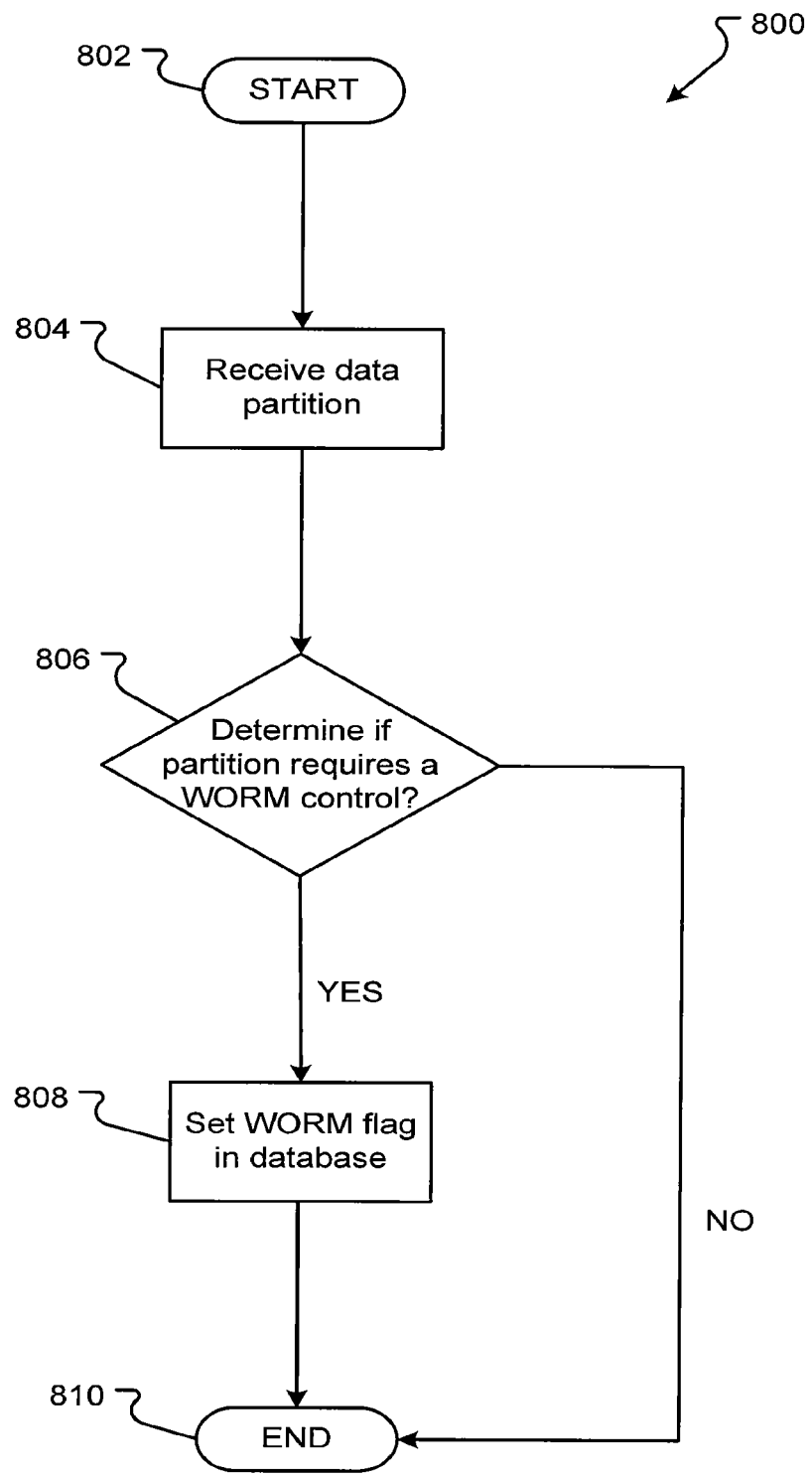
FIG. 8 is a flow diagram of an embodiment of a method for creating a Write Once Read Many (WORM) enforcement policy in an archiving system.

An embodiment of a method 800 for setting WORM policies is shown in FIG. 8. In embodiments, the method generally begins with a START operation 802 and terminates with an END operation 810. The steps shown in the method 800 may be executed in a computer system as a set of computer executable instructions. While a logical order is shown in FIG. 8, the steps shown or described can, in some circumstances, be executed in a different order than presented herein.

Receive operation 804 receives partition data. In embodiments, the archival management system 310-1 (FIG. 3) receives one or more instructions to create an application layer partition in the RDA 232-2 (FIG. 3). The archival management system 310-1 (FIG. 3) can request the user to determine if WORM protection is desired for the application layer partition. In alternative embodiments, the archival management system 310-1 (FIG. 3) receives instructions for one or more files not necessarily stored in an application layer partition. In embodiments, the WORM control is enforced on each disk drive in the application layer partition.

Determine operation 806 determines if the application layer partition has WORM control. In embodiments, the archival management system 310-1 (FIG. 3) determines if an instruction to establish a WORM policy for the application layer partition is received. For example, the user sends a signal that WORM enforcement is to be established for the application layer partition. If there is to be WORM enforcement, the method flows YES to set operation 808. If there is to be no WORM enforcement, the method flows NO to terminate 810, and the application layer partition is created without WORM control.

Set operation 808 sets the WORM flag in the database. In embodiments, the archival management system 310-1 (FIG. 3) sets a flag or other indicator in the database 318-1 (FIG. 3) that WORM enforcement applies to the application layer partition. For example, the archival management system 310-1 (FIG. 3) sets the WORM flag 628 (FIG. 6B) in the controls 608-2 (FIG. 6B) for the application layer partition record 602 (FIG. 6A). In alternative embodiments, the archival management system 310-1 (FIG. 3) also sets one or more other controls associated with the WORM control or enforcement, such as permissions or time periods.

Figure 9:
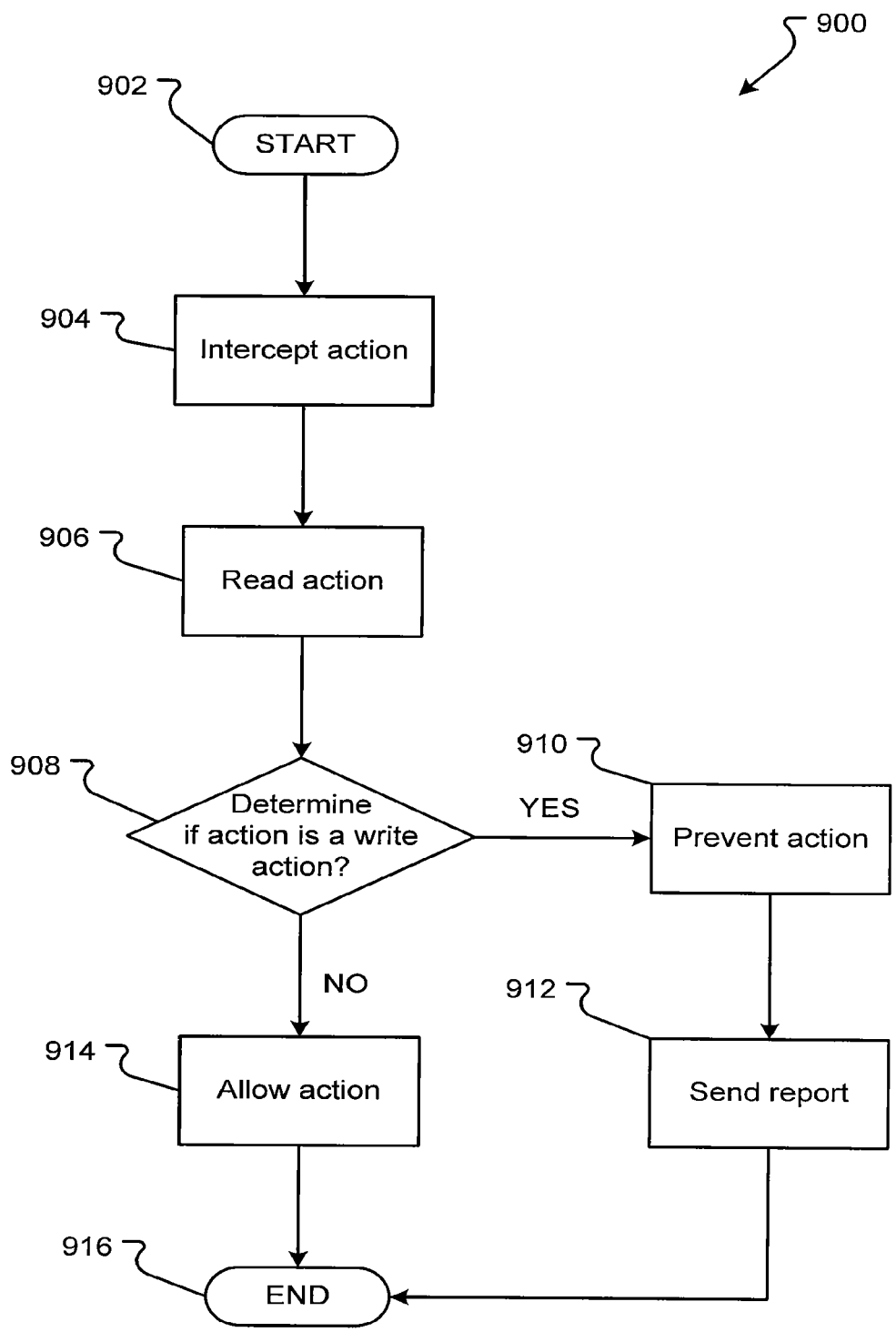
FIG. 9 is a flow diagram of an embodiment of a method for enforcing a WORM enforcement policy in an archiving system.

An embodiment of a method 900 for enforcing WORM policies is shown in FIG. 9. In embodiments, the method generally begins with a START operation 902 and terminates with an END operation 916. The steps shown in the method 900 may be executed in a computer system as a set of computer executable instructions. While a logical order is shown in FIG. 9, the steps shown or described can, in some circumstances, be executed in a different order than presented herein.

Intercept operation 904 intercepts an action. In embodiments, the archival management system 310-1 (FIG. 3) intercepts an action received at the network storage system 302 that either is placed into the program stack or before the action is placed in the program stack, which prevents the action from being placed in the program stack, at least temporarily. The archival management system 310-1 (FIG. 3), in embodiments, intercepts all actions to determine if the action violates WORM policies. In an alternative embodiment, the archival management system 310-1 (FIG. 3) only intercepts write actions or actions other than read actions. The intercept module 904, in embodiments, intercepts the action.

Read operation 906 reads the information about the action. The archival management system 310-1 (FIG. 3), in embodiments, reads the metadata or data in the action. For example, the archival management system 310-1 (FIG. 3) reads the type of action. The read module 906, in embodiments, reads the data associated with the action.

Determine operation 908 determines if the action is a write action. In embodiments, the archival management system 310-1 (FIG. 3) determines from the read data if the action is a write action. A write action is any action where the data may be altered. In an alternative embodiment, the archival management system 310-1 (FIG. 3) determines if the action is something other than a read action. The prevention module 708 (FIG. 7), in embodiments, determines if the action is a write action. If the action is a write action or an action other than a read action and violates WORM policies, the method flows YES to prevent operation 910. If the action is a read action or something other than a write action and does not violate WORM polices, the method flows NO to allow operation 914. In embodiments, the application layer partition controls, for the application layer partition addressed by the action, is checked to determine if the application layer partition has a WORM control in the database. If the application layer partition does have a WORM control, the action is reviewed to determine if the action is a write action on existing data.

Prevent operation 910 prevents the action. In embodiments, the archival management system 310-1 (FIG. 3) prevents the action in the program stack from executing. In other embodiments, the archival management system 310-1 (FIG. 3) removes the action from the program stack or prevents the action from being placed in the program stack. The prevention module 708 (FIG. 7), in embodiments, prevents the action.

Send operation 912 sends a report. The archival management system 310-1 (FIG. 3), in embodiments, informs the application server or other entity that the action was prevented or did not execute. Thus, the application server or other entity does not mistakenly believe that the action was completed. In embodiments, the archival management system 310-1 (FIG. 3) sends a report 712 (FIG. 7) to the application server. The reporting module 710, in embodiments, sends the report.

Allow operation 914 allows the action. In embodiments, the archival management system 310-1 (FIG. 3) allows the read of the data or action other than a write action to execute.

In light of the above description, a number of advantages of the present disclosure are readily apparent. For example, data in the RDA or active archive may be protected in the network storage system regardless of the fact that random access memory is used. Further, in embodiments, a mechanical device is not needed to enforce the WORM protection.

A number of variations and modifications of the disclosure can also be used. For example, the WORM setting may also be set in the metadata of the embedded memory 104 (FIG. 1) of the removable disk drive. As such, the removable disk drive may be removed from the RDA and, when reinserted, the removable disk drive will still be protected by WORM settings. In alternative embodiments, it may be possible to remove WORM enforcement from one or more items of data. However, embodiments of the data provide WORM protection permanently after WORM enforcement is set.

While the principles of the disclosure have been described above in connection with specific apparatuses and methods, it is to be clearly understood that this description is made only by way of example and not as limitation on the scope of the disclosure.

What is claimed is:

1. A network storage system comprising:
a plurality of removable drives, each removable drive comprising memory configured to store archival data;
a plurality of drive ports in communication with one or more application servers, the plurality of drive ports configured to receive the archival data from the one or more application servers and send the archival data to the memory for storage; and
a database storing a Write Once Read Many (WORM) policy, the WORM policy configured to prevent the archival data from being overwritten on the plurality of removable drives;
wherein the database stores one or more controls for one or more application layer partitions of the network storage system, each of the application layer partitions spanning two or more of the plurality of removable drives, the one or more controls including the WORM policy, wherein the WORM policy protects the archival data in the one or more application layer partitions by preventing the archival data from being overwritten.

2. The network storage system of claim 1, further comprising:
an archival management system in communication with the plurality of removable drives, the archival management system configured to provide a partitioned archive such that the network storage system appears to be an independent file system to each of the one or more application servers, wherein the archival management system maintains the partitioned archive for the one or more application servers.

3. The network storage system of claim 2, wherein the archival management system manages the network storage system as multiple, independent file systems for the one or more application servers.

4. The network storage system of claim 2, wherein the archival management system comprises an active archive and an active archive management module in communication therewith, the active archive management module configured to send the archival data to and retrieve the archival data from the active archive.

5. The network storage system of claim 2, wherein the archival management system comprises an audit module configured to record access to the archival data.

6. The network storage system of claim 2, wherein the archival management system comprises a protection module configured to set the WORM policy for the network storage system and enforce the WORM policy on the archival data.

7. The network storage system of claim 2, wherein the archival management system comprises a prevention module configured to prevent write actions requested by the one or more application servers.

8. The network storage system of claim 7, wherein the archival management system further comprises a reporting module configured to report that the write actions requested by the one or more application servers were not executed.

9. The network storage system of claim 7, wherein the prevention module is configured to allow read actions requested by the one or more application servers.

10. The network storage system of claim 1, wherein the memory comprises one or more of random access memory, magnetic random access memory, core memory, a magnetic disk storage medium, an optical storage medium, a flash memory device, a hard disk drive, a solid state disk, and a solid state drive.

11. A method for operating a network storage system comprising a plurality of removable drives, the method comprising:
creating an application layer partition spanning two or more of the removable drives in the network storage system;
determining whether the application layer partition has write once read many (WORM) control;
if the application layer partition has the WORM control, setting a WORM flag in a database of the network storage system, such that the WORM control is applied to all data stored in the two or more removable drives spanned by the application layer partition; and
if the application layer partition does not have the WORM control, creating the application layer partition spanning the two or more removable drives without enforcing the WORM control.

12. The method of claim 11, further comprising enforcing the WORM control on the two or more removable drives spanned by the application layer partition, such that all of the data stored thereon are immutable.

13. The method of claim 12, further comprising receiving a signal from a user indicating that the WORM control is to be enforced on the application layer partition.

14. The method of claim 12, further comprising:
intercepting an action requested for the network storage system; and
preventing the action, if the action is a write action in violation of the WORM control enforced on each removable drive spanned by the application layer partition.

15. The method of claim 14, further comprising reporting that the write action in violation of the WORM control was prevented.

16. The method of claim 14, further comprising allowing the action, if the action is a not in violation of the WORM control.

17. The method of claim 12, further comprising replacing one of the two or more removable drives spanned by the application layer partition with a newly inserted removable drive.

18. The method of claim 17, further comprising applying the WORM control to the newly inserted removable drive.

19. A non-transitory computer readable medium having a program stored thereon, the program executable by a processor to perform a method comprising:
- creating an application layer partition spanning two or more removable data cartridges in a network storage system;
- determining whether the application layer partition is subject to a write once read many (WORM) policy;
- enforcing the WORM policy on the application layer partition, such that all data stored on the two or more removable data cartridges spanned by the application layer partition are immutable.

20. The non-transitory computer readable medium of claim 19, wherein enforcing the WORM policy on the application layer partition comprises:
- intercepting an action requested for the network storage system;
- allowing the action, if the action is a read action; and
- preventing the action, if the action is a write action in violation of the WORM control enforced on each removable data cartridge spanned by the application layer partition.

21. The non-transitory computer readable medium of claim 19, the method comprising addressing drive ports in communication with the removable data cartridges spanned by the application layer partition, wherein the WORM policy is enforced on newly inserted removable data cartridges in the drive ports.

* * * * *